United States Patent
Jaynes

[19]

[11] Patent Number: 5,911,507
[45] Date of Patent: Jun. 15, 1999

[54] TEMPERATURE DISPLAY DEVICE

[76] Inventor: Bruce Jaynes, 423 1st Ave. #4, Salt Lake City, Utah 84103

[21] Appl. No.: 08/775,017

[22] Filed: Dec. 27, 1996

[51] Int. Cl.$^6$ .............................. G01K 3/00; G01K 1/02
[52] U.S. Cl. ............................................ 374/102; 374/170
[58] Field of Search ..................................... 374/100, 102, 374/104, 106, 110, 111, 137, 163, 166, 170, 208; 364/557

[56] References Cited

U.S. PATENT DOCUMENTS

| | | | |
|---|---|---|---|
| 4,298,947 | 11/1981 | Tamura et al. | 374/170 |
| 4,372,692 | 2/1983 | Thomae | 374/104 |
| 4,447,884 | 5/1984 | Wada | 374/170 |
| 4,636,093 | 1/1987 | Nagasaka et al. | 374/102 |
| 4,691,713 | 9/1987 | Suzuki | 374/104 |
| 4,742,227 | 5/1988 | Takenaka | 374/102 |
| 4,771,791 | 9/1988 | Kubouchi | 374/102 |

Primary Examiner—G. Bradley Bennett
Attorney, Agent, or Firm—Jerry Semer

[57] ABSTRACT

This invention is basically a device that takes the outside temperature continuously and displays that temperature in fifteen minute intervals. In the preferred embodiment the device displays the temperature in fifteen minute intervals over the past six hours. In the preferred embodiment the device also shows the high and low temperature over a given period of time. Plus the current temperature and the time. This display is a liquid crystal display. The device uses a probe to measure the temperature and send that information back to the display unit. The probe in one embodiment is attached to the display unit by a wire. In another embodiment the readings of the probe are sent to the display unit by radio telemetry.

5 Claims, 4 Drawing Sheets

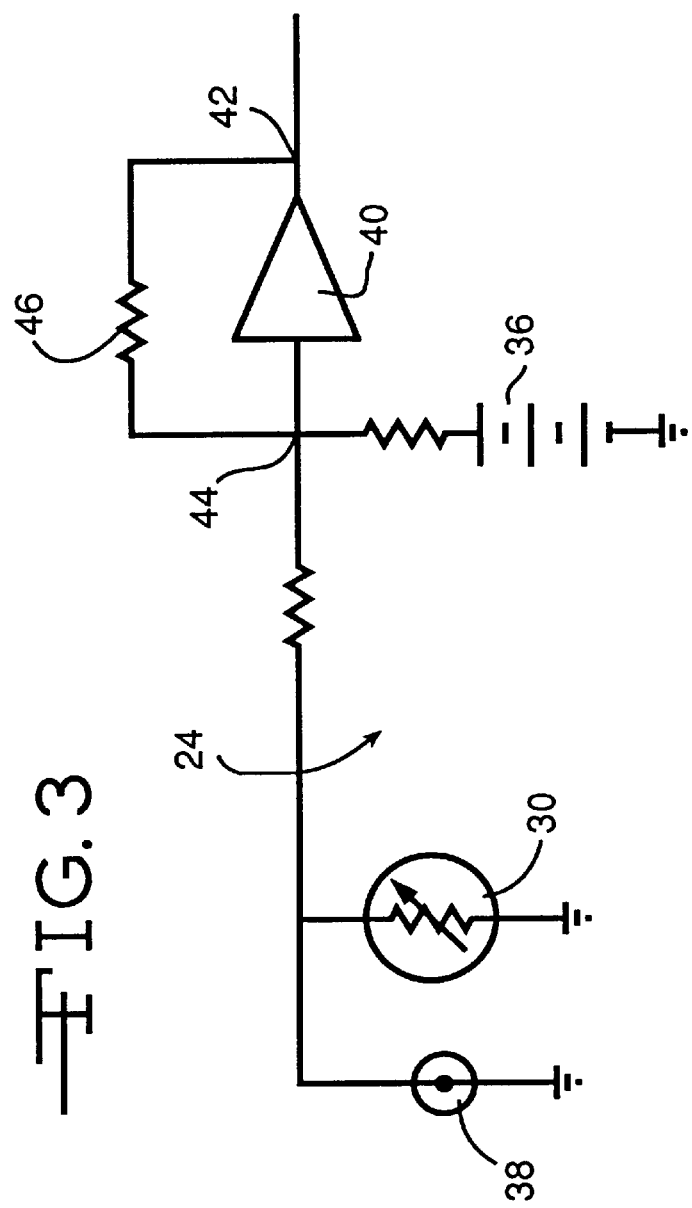

TEMPERATURE DISPLAY DEVICE

FIELD OF THE INVENTION

This invention relates to a device that takes and displays temperatures.

BACKGROUND OF THE INVENTION

Homeowners concerned with maintaining comfortable temperatures in their living quarters while minimizing their use of expensive energy, gardeners who must protect plants from frost or from drought, or individuals who are just worried about what to wear on a given day, all need more than just the temperature at the given moment. One needs to see how the temperature has changed over the past few hours. Thus one of the objectives of this invention is to devise a device that displays the range of temperatures over a given period of time.

The inventor has found temperature reading in the fifteen minute intervals for over a period of approximately six hours will give the individual a good indication as to the where the temperature is going in the next few hours. Thus, one of the objectives of this invention is to have a device where an individual can readily see temperatures in fifteen minute intervals over the past six hours. With this information, an individual could predict with some accuracy what the temperatures will be over the next few hours.

The inventor also realizes that people wanting to predict what they should wear on a certain day do not need the indoor temperature but the outside temperature. Thus, one of the objectives of the inventor is to devise a device that will measure the outdoor temperature and place it on display for the individual. Further the inventor has realized that individuals such as farmers worrying about freezing need to know temperatures some distance from their home. Thus, one of the objectives of the inventor is to make a system that measures temperature and sends it back to the display some distance away. The inventor also wishes to make this device easy to manufacture.

BRIEF DESCRIPTION OF THE DRAWINGS

FIG. 2 is a view of the display unit and the temperature probe connected with a cord.

FIG. 3 is circuit diagram of the probe.

SUMMARY OF THE INVENTION

This invention is basically a device that takes the outside temperature continuously and displays that temperature in fifteen minute intervals. In the preferred embodiment the device displays the temperature in fifteen minute intervals over the past six hours. In the preferred embodiment the device also shows the high and low temperature over a given period of time, plus the current temperature and the time. This display is a liquid crystal display. The device uses a probe to measure the temperature and send that information back to the display unit. The probe in one embodiment is attached to the display unit by a wire. In another embodiment the readings of the probe are sent to the display unit by radio telemetry.

DETAILED DESCRIPTION OF THE PREFERRED EMBODIMENT

Figure 1:
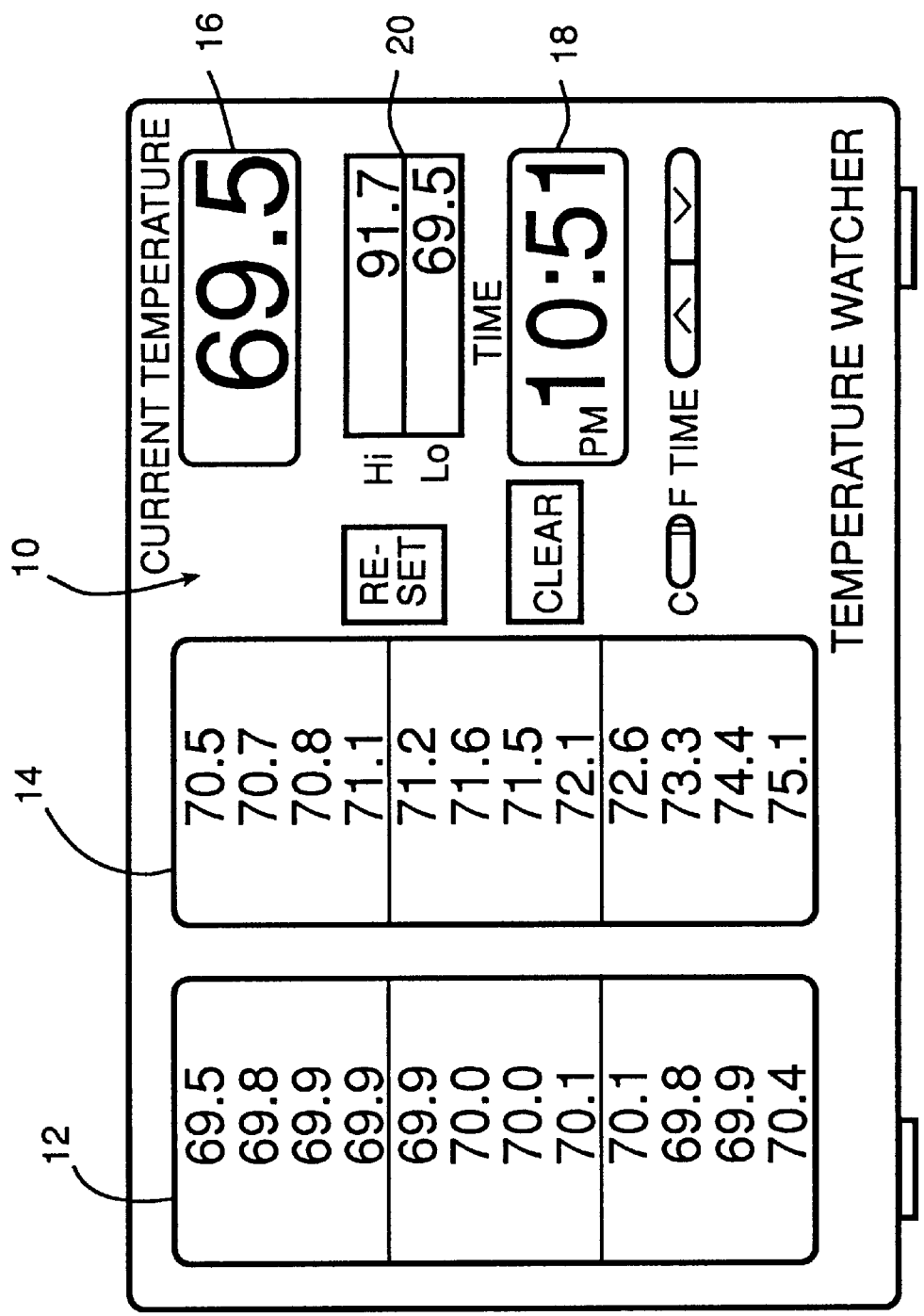
FIG. 1 is the front of the display unit of the invention.

FIG. 1 shows the display portion of the invention. In FIG. 1 there are 2 large sections 12 and 14 that display temperatures and time. In the preferred embodiment these two large areas of display are designed to display twenty-four different temperatures and times. This would allow an individual to show the times and temperature of the past six hours at fifteen minute intervals. In the preferred embodiment there is also a current temperature display 16 and a current time display 18. There is also a display 20 for the high and low temperature over a certain period of time. There are also buttons on the front of the temperature display 10 for setting the time. The display can be designed to have more or less than twenty-four different temperatures. The display can also be designed to display temperatures in half hour or hour intervals or interval of any time length. In the preferred embodiment the display is a liquid crystal display; however any type of display can be used.

FIG. 2 shows the temperature watcher display with a remote temperature probe attached by a wire cord 22 to the display 10.

FIG. 3 shows a possible circuitry for the probe 24. In this probe 24 the thyristor 30 is fed by a current source 38 derived from battery 36 in a conventional manner. The output from the system is amplified by operational amplifier 40 having an output terminal 42, and input node 44 and a feedback resistor 46. When these components are properly scaled or conditioned the output voltage at its output terminal 42 corresponding to the temperature measured by the probe. The probe 24 sends its output data in analog form to the control unit 52 in the display module 10. The analog data from probe is fed through an analog to digital converter 50 and the digital data output is directed to the control unit 52.

Figure 4:
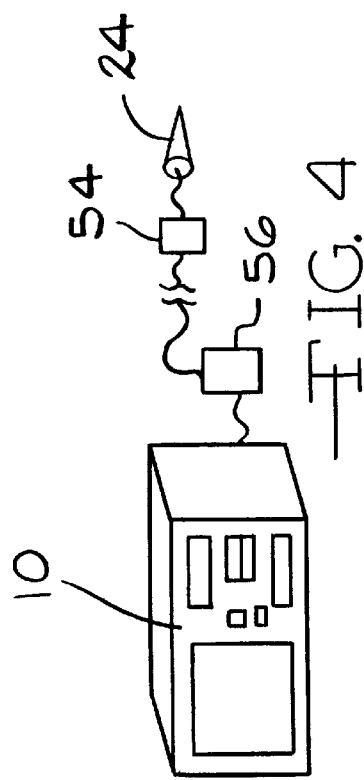
FIG. 4 is a view of the display unit of the invention and the temperature probe when the display unit and temperature probe are a substantial distance apart and are connected by radio telemetry.

FIG. 4 shows another embodiment of the invention in which the temperature probe is a substantial distance from the control unit. This embodiment would be used by an orchard owner whose orchard was a considerable distance from his home. In this case the temperature probe 24 is similar to the one shown in FIG. 4. The output data from this probe 24 goes to a radio telemetry system 54 and the radio telemetry system 54 would then send out the information to the display unit 10. The display unit 10 would have a radio receiver that receives the radio telemetry and decoded it into digital data that could be used by the control unit 52. There are other methods that could be used to send data from a remote location.

Figure 5:
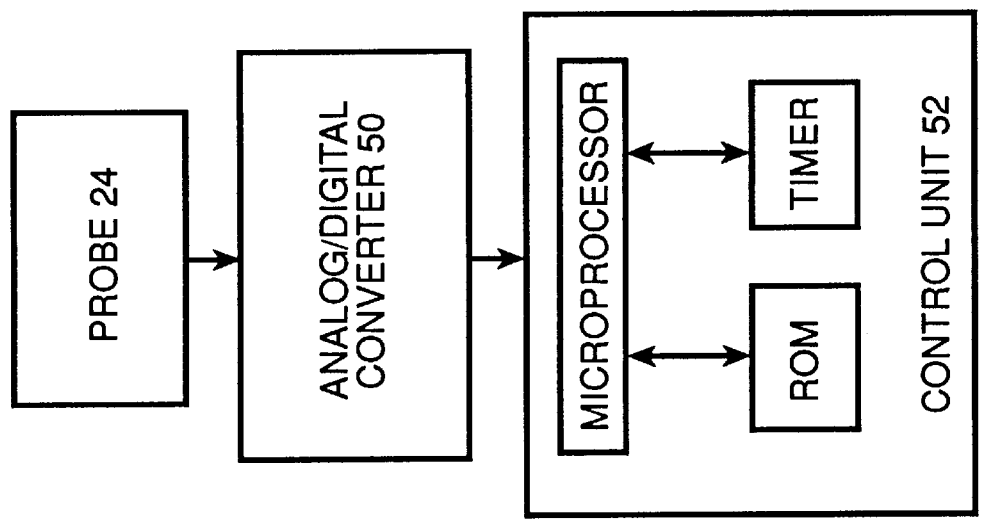
FIG. 5 is a flow chart diagram of the workings of the display unit.

FIG. 5 is a flowchart diagram of the inner working of the display unit. In FIG. 7 the display unit takes in information from the probe and runs it through an analog to digital converter 50 to change it into information that can be used by the control unit 50. The control unit 50 can be a microprocessor as in the preferred embodiment or a hard wired unit. The microprocessor instructions have been written in, in a read-only memory 70. These instructions instruct the microprocessor when to get data from the probe and when to send data to the display unit. In the preferred embodiment there is also a timer which tells the central processor when a certain measurement of time has occurred. These timers are readily available on the market. Also the device could be devised without a timer and have the microprocessor through its software keep track of the time. Programs like this are readily known in the art.

Figure 6:
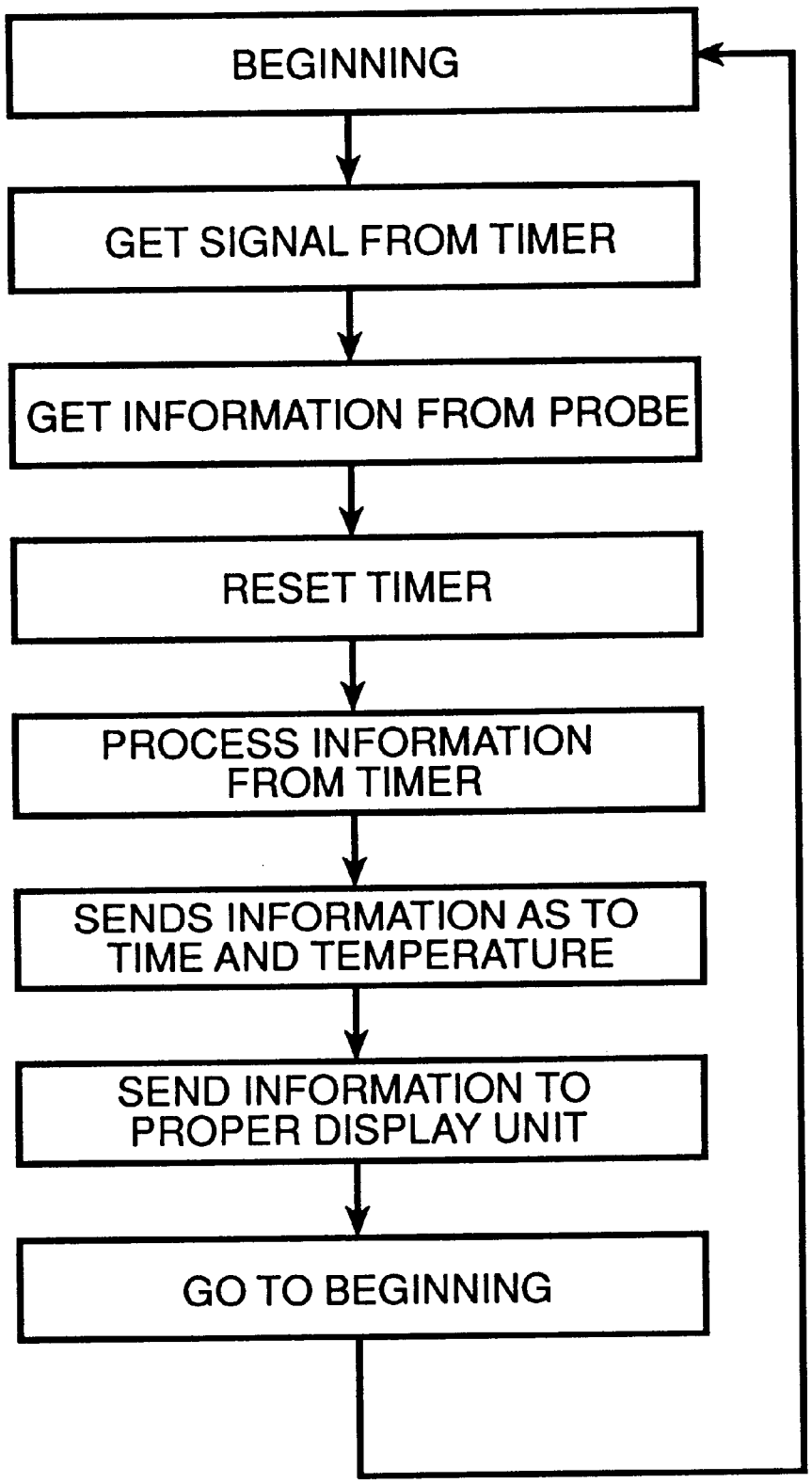
FIG. 6 is a flow chart of the instructions of the microprocessor of the display unit.

FIG. 6 is a flowchart of the instructions of the microprocessor. The process is reasonably simple. The microprocessor first gets information as to the time from the timer. Then the microprocessor gets data from the temperature probe through the analog to digital converter as to the temperature. The microprocessor at this time sends a signal to the timer to reset for a certain length of time. The microprocessor then processes the information as to time and temperature and sends that information to the proper display item. It sends the information as to the time and temperature to the display unit. The microprocessor then waits for the timer to send it a signal that a certain unit of time has passed. When the microprocessor receives this signal it begins the cycle again.

Changes and modifications in the specificity described embodiments can be carried out without departing from the scope of the invention which is intended to limited only by the scope of the appending claims.

I claim:

1. An electronic device that displays the time and temperature in numerous intervals comprising:
   a. a probe that produces data as to temperature; and,
   b. a control unit; and,
   c. a means for converting the data from the probe into data that can be used by the control unit; and,
   d. a means for transferring data on temperature from the probe to the means for converting data; and,
   e. a display; and,
   f. a timer; and,
   g. the control unit receives data from the means for converting data from the probe into data to be used by the control unit and said control unit manipulates that data in such a fashion that it can be sent to the display unit and the display can represent that data as a temperature and said control unit also sends to the display unit the time at which it received the data as to temperature and said control unit is designed to get the data at fifteen minute intervals, these intervals are timed by the timer and said timer sends the control unit a signal as to the fifteen minute intervals and the control unit then gets the data from the means for converting data from the probe into data that can be used by the control unit and said control unit then sends the information to the display unit and the display unit displays the temperature and the said display unit displays the temperatures in fifteen minute intervals over the past six hours.

2. An electronic device that displays time and temperature in numerous intervals as in claim 1 wherein:
   a. the means for transferring data on temperature from the probe to the means for converting data is a wire.

3. An electronic device that displays time and temperature in numerous intervals as in claim 1 wherein:
   a. the means for transferring data on temperature from the probe to the means for converting data is a radio telemetry system.

4. An electronic device that displays time and temperature in numerous intervals as in claim 1 wherein:
   a. the display is a liquid crystal display.

5. An electronic device that displays time and temperature in numerous intervals as in claim 1 wherein:
   a. the means for converting data form the probe into data that can be used by the control unit is an analog digital converter.

* * * * *